US011797069B2

(12) United States Patent
Nishizaka

(10) Patent No.: US 11,797,069 B2
(45) Date of Patent: Oct. 24, 2023

(54) SERVER AND MATCHING SYSTEM FOR MATCHING A USED BEV ABLE TO SUPPLY POWER WITH A LOCATION FOR STORING THE USED BEV

(71) Applicant: HONDA MOTOR CO., LTD., Tokyo (JP)

(72) Inventor: Masaru Nishizaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/668,384

(22) Filed: Feb. 10, 2022

(65) Prior Publication Data

US 2022/0308647 A1    Sep. 29, 2022

(30) Foreign Application Priority Data

Mar. 23, 2021 (JP) ................... 2021-048523

(51) Int. Cl.
  *G06F 1/26* (2006.01)
  *G06F 1/28* (2006.01)

(52) U.S. Cl.
  CPC ............ *G06F 1/28* (2013.01); *G06F 1/263* (2013.01)

(58) Field of Classification Search
  CPC .......... G06F 1/28; G06F 1/263; G06Q 10/02; G06Q 30/02; G06Q 30/06; G06Q 50/06; G06Q 50/30; B60L 53/68; B60L 53/10; B60L 53/64; B60L 53/665; B60L 53/67; B60L 53/305; Y02T 10/70; Y02T 10/7072; Y02T 90/12; Y02T 90/14; Y02T 90/16; Y02T 90/167; Y02T 10/72; Y04S 30/12
  See application file for complete search history.

(56) References Cited

U.S. PATENT DOCUMENTS

| 2009/0144150 A1* | 6/2009 | Sakakibara | G06Q 50/06 705/14.62 |
| 2016/0052404 A1* | 2/2016 | Enomoto | B60L 53/305 320/108 |
| 2018/0118045 A1* | 5/2018 | Gruzen | B60L 53/665 |

(Continued)

FOREIGN PATENT DOCUMENTS

| JP | 2011166355 A | 8/2011 |
| JP | 2013130963 A | 7/2013 |

(Continued)

*Primary Examiner* — Danny Chan
(74) *Attorney, Agent, or Firm* — CKC & Partners Co., LLC

(57) ABSTRACT

A purpose of the present invention is to cause a used BEV to perform work at low cost, and allow a user to inexpensively charge a BEV.

A matching system according to the present invention is provided with: a device owner information acquisition unit acquires device owner information on a device owner who owns at least one device provided with a battery; a storage location owner information acquisition unit acquires storage location owner information on a storage location owner who owns a location at which the at least one device can be stored; a matching unit matches the device owner information with storage location information included in the storage location owner information; a storage unit stores power supply location information for where a match is established; and a notification unit notifies the power supply location information to a user having a device provided with a battery.

6 Claims, 10 Drawing Sheets

(56) References Cited

U.S. PATENT DOCUMENTS

| | | | |
|---|---|---|---|
| 2018/0257498 A1* | 9/2018 | Delp | G01C 21/3469 |
| 2019/0118665 A1 | 4/2019 | Mizutani et al. | |
| 2019/0128684 A1 | 5/2019 | Mizutani et al. | |
| 2019/0130661 A1 | 5/2019 | Mizutani et al. | |
| 2019/0130751 A1 | 5/2019 | Mizutani et al. | |
| 2019/0132719 A1 | 5/2019 | Mizutani et al. | |

FOREIGN PATENT DOCUMENTS

| | | |
|---|---|---|
| JP | 2019079331 A | 5/2019 |
| JP | 2019086842 A | 6/2019 |
| JP | 2019086843 A | 6/2019 |
| JP | 2019086844 A | 6/2019 |
| JP | 2019088041 A | 6/2019 |
| JP | 2021033590 A | 3/2021 |

* cited by examiner

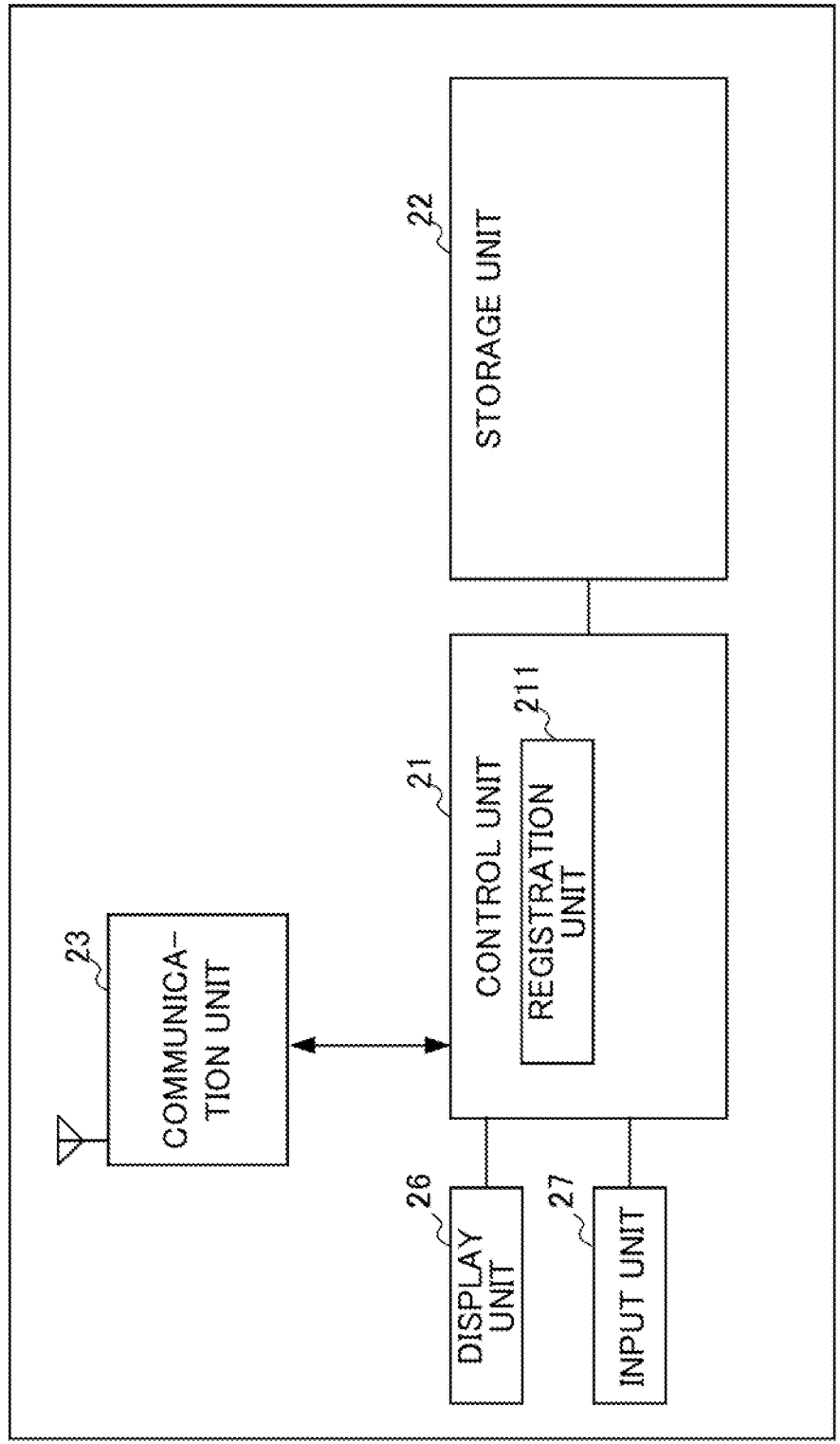

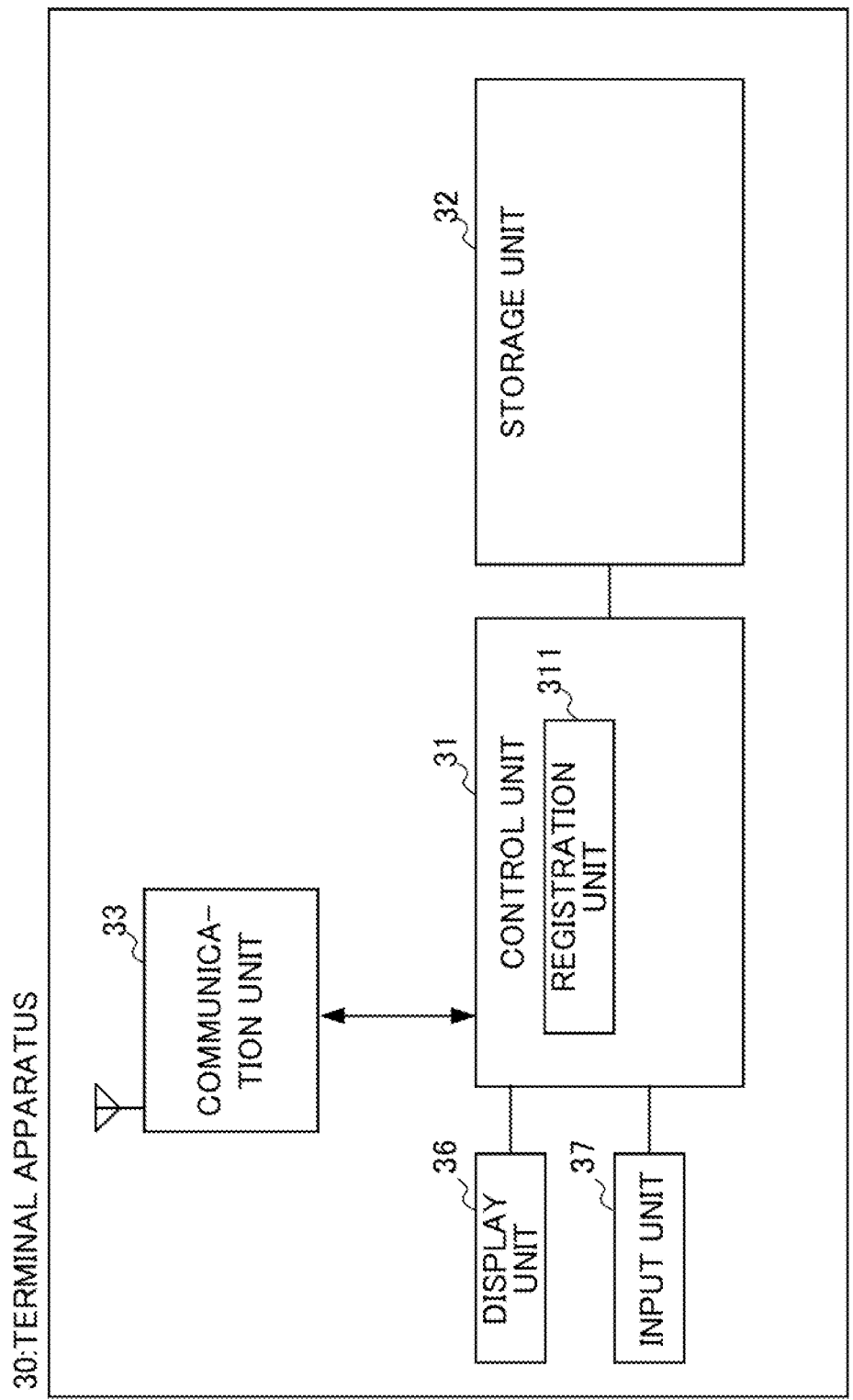

SERVER AND MATCHING SYSTEM FOR MATCHING A USED BEV ABLE TO SUPPLY POWER WITH A LOCATION FOR STORING THE USED BEV

This application is based on and claims the benefit of priority from Japanese Patent Application No. 2021-048523, filed on 23 Mar. 2021, the content of which is incorporated herein by reference.

BACKGROUND OF THE INVENTION

Field of the Invention

The present invention pertains to a server and a matching system for matching a device able to supply power with a location for storing the device.

Related Art

Patent Document 1 proposes a technique for notifying power supply destination candidate information which includes information regarding a plurality of power-reception vehicles to a power-supply vehicle in order to cause the power-supply vehicle to select one of the plurality of power-reception vehicles, match the power-supply vehicle with the power-reception vehicle selected by the power-supply vehicle, and transmit matching determination information which includes information regarding the matched vehicles (the power-supply vehicle and the power-reception vehicle) and a meeting location to the power-supply vehicle and the power-reception vehicle.

Patent Document 2 also proposes a technique for notifying a meeting candidate location list which includes information regarding a plurality of parking lots owned by third parties who are not owners of matched vehicles (power-reception vehicle and power-supply vehicle) to the matched vehicles, and determining a meeting location by causing the matched vehicles to select one of the plurality of parking lots included in the meeting candidate location list.

Patent Document 3 also proposes a technique for, in order to match a power-supply vehicle with a power-reception vehicle, using power supply permission information indicating current position and amount of power which can be supplied for each power-supply vehicle and charging request information indicating current position and requested power reception amount for each power-reception vehicle, and determining a meeting location which enables the suppression of power amount mismatches between power-supply vehicles and power-reception vehicles.

Patent Document 4 also proposes a technique for, when setting power-supply vehicles and power-reception vehicles from among a plurality of vehicles and matching a power-supply vehicle with a power-reception vehicle, prohibiting the setting of a vehicle which has a history of receiving power from another vehicle to be a power-supply vehicle in matching processing, and repeating the supply of power and reception of power between vehicles to thereby suppress electrical power loss.

Patent Document 5 also proposes a technique in which a server, which can communicate with a plurality of vehicles and a plurality of electrical power stations, receives an amount of power received from a vehicle or an amount of power-supplied to a vehicle at each electrical power station in association with a vehicle user ID, sets value points taking into account an amount of power received from an electrical power station, and grants the value points to the user having the user ID associated with the amount of power to thereby facilitate the use of power, stored in the vehicle at another time or another location.

Patent Document 1: Japanese Unexamined Patent Application, Publication No. 2019-86843
Patent Document 2: Japanese Unexamined Patent Application, Publication No. 2019-88041
Patent Document 3: Japanese Unexamined Patent Application, Publication No. 2019-86842
Patent Document 4: Japanese Unexamined Patent Application, Publication No. 2019-86844
Patent Document 5: Japanese Unexamined Patent Application, Publication No. 2019-79331

SUMMARY OF THE INVENTION

Incidentally, accompanying the spread of electric automobiles (hereinafter, may be referred to as "BEV (Battery Electric Vehicle)"), there will be more used BEVs from now on in the used car market. However, in order to keep the performance of a BEV, it is necessary to cause the BEV to perform work (charging and discharging), but it takes time and money for a used car dealer to cause each of a plurality of BEVs (may be referred to below as a "used BEV" or an "idle BEV") to perform work (charging and discharging). In addition, in order to cause a used BEV to be linked to the electrical power grid in order to cause the used BEV to perform work (charging and discharging), bidirectional vehicle-to-grid (V2G) charging equipment is necessary, which incurs a high cost.

In contrast, consideration may be given to cases where a party such as an owner of idle land or a shopping center which has a large parking lot wants to utilize the idle land or the large parking lot (may be referred to below as "idle space").

There is also the possibility that, for example, quick chargers—some of which are free-of-charge—will all be pay-to-use in the future, accompanying the spread of BEVs. Therefore, a user who uses a BEV would desire to recharge the BEV as inexpensively as possible.

Accordingly, an object of the present invention is to provide a server, matching system, and matching method for enabling causing a used BEV to perform work at low cost, and enabling a user to inexpensively charge a BEV.

(1) A server according to the present invention (for example, a server 10 described below) is provided with: a device owner information acquisition unit (for example, a device owner information acquisition unit 111 described below) configured to acquire, via a terminal apparatus (for example, a terminal apparatus 20 described below) held by a device owner who owns at least one device provided with a battery, device owner information regarding the device owner;

a storage location owner information acquisition unit, (for example, an idle space owner information acquisition unit 112 described below) configured to acquire, via a terminal apparatus (for example, a terminal apparatus 30 described below) held by a storage location owner who owns a location at which the at least one device can be stored, storage location owner information regarding the storage location owner;

a matching unit (for example, a matching unit 114 described below) configured to match the device owner information acquired by the device owner information acquisition unit with storage location information included in the storage location owner information acquired by the storage location owner information acquisition unit;

a storage unit (for example, a storage unit 12 described below) configured to store, as power supply location information regarding a power supply location at which power can be supplied from the battery with which the device is provided, location information for where a match is established by the matching unit and at least one of the device is stored; and a notification unit (for example, a notification unit 115) configured to notify the power supply location information stored by the storage unit to a user having a device provided with a battery.

By virtue of the abovementioned (1), it is possible to cause a used BEV to perform work at low cost, and it is possible for a user to inexpensively charge a BEV.

(2) In the server according to (1), the device provided with the battery includes any one of at least an electric automobile, an electric motorcycle, and a household storage battery.

By virtue of the abovementioned (2), an effect similar to that of (1) can be achieved.

(3) In the server according to (1) or (2), the storage unit further stores, in the location information stored as the power supply location information, advertising information which includes service information, and the notification unit notifies the advertising information together with the power supply location information.

By virtue of the abovementioned (3), in exchange for managing charging and discharging for a used BEV in the idle space and providing a V2V power supply free-of-charge or inexpensively, an owner of an idle space can get more users to use the facility and thereby achieve more profit.

(4) In the server according to one of (1) through (3), the storage unit further stores a record of visits by the device held by the user who received a notification from the notification unit for supply of power, and the server is further provided with a calculation unit configured to calculate, based on the record, a device storage fee to be charged to the device owner.

By virtue of the abovementioned (4), an outsourcing operation fee can be discounted.

(5) The server according to (4) is further provided with: a presentation unit configured to present other storage location owner information to the device owner based on the record.

By virtue of the abovementioned (5), it is possible to recommend an idle space which should be used for more power supply.

(6) The server according to one of (1) through (5) is further provided with an acquisition unit configured to acquire, from an external apparatus, electrical depletion information regarding the device held by the user; and an instruction unit configured to, based on the electrical depletion information, make an instruction for dispatching one device from among a plurality of devices stored at a storage location to the device held by the user.

By virtue of the abovementioned (6), it is possible to dispatch a used BEV to a user's BEV which has incurred electrical depletion, and charge the user's BEV.

(7) A matching system 1 (for example, a matching system 1 described below) according to the present invention is provided with: a server (for example, the server 10 described below) according to one of (1) through (6);

one or more terminal apparatuses (for example, the terminal apparatus 20 described below) respectively held by one or more device owners who each own at least one device provided with a battery;

one or more terminal apparatuses (for example, the terminal apparatus 30) respectively held by one or more storage location owners who each own a location where at least one of the device can be stored; and one or more user terminals (for example, the user terminal 40) respectively held by one or more users who each use a device provided with a battery.

By virtue of the abovementioned (7), an effect similar to that of (1) can be achieved.

(8) A matching method according to the present invention is a matching method which is realized by a computer and includes:

a device owner information acquisition step configured to acquire, via a terminal apparatus (for example, the terminal apparatus 20 described below) held by a device owner who owns at least one device provided with a battery, device owner information regarding a device owner;

a storage location owner information acquisition step configured to acquire, via a terminal apparatus (for example, the terminal apparatus 30 described below) held by a storage location owner who owns a location at which the at least one device can be stored, storage location owner information regarding the storage location owner;

a matching step configured to match the acquired device owner information with storage location information included in the storage location owner information;

a storage step configured to store, as power supply location information regarding a power supply location at which power can be supplied from the battery the device is provided with, location information for where a match is established and at least one of the device is stored; and a notification step configured to notify the stored power supply location information to a user having a device provided with a battery.

By virtue of the abovementioned (8), an effect similar to that of (1) can be achieved.

By virtue of the present invention, it is possible to cause a used BEV to perform work at low cost, and it is possible for a user to inexpensively charge a BEV.

BRIEF DESCRIPTION OF THE DRAWINGS

FIG. 4 is a functional block diagram illustrating a functional configuration of a terminal apparatus in an embodiment according to the present invention;

FIG. 5 is a functional block diagram illustrating a functional configuration of a terminal apparatus in an embodiment, according to the present invention;

DETAILED DESCRIPTION OF THE INVENTION

With reference to the drawings, description is given below regarding a preferred embodiment of a matching system according to the present invention. Example is given here with a BEV as a device provided with a battery, and a used car dealer as a device owner who owns at least one used BEV. Note that, as a device provided with a battery, the present invention can also be applied to an electric motorcycle or a household storage battery, for example. The present invention can also be applied to, for example, an individual who owns at least one idle BEV (used BEV).

As an owner who owns idle space which is a location at which a plurality of used BEV can be stored, it is possible to exemplify a restaurant or a supermarket where short-term parking of approximately 30 minutes to one hour is performed, or a shopping center or attraction facility where mid-term parking of approximately several hours is performed. Note that the present invention can also be applied to an owner such as a lodging facility or a camp site where long-term parking in units of days is performed.

Figure 1:
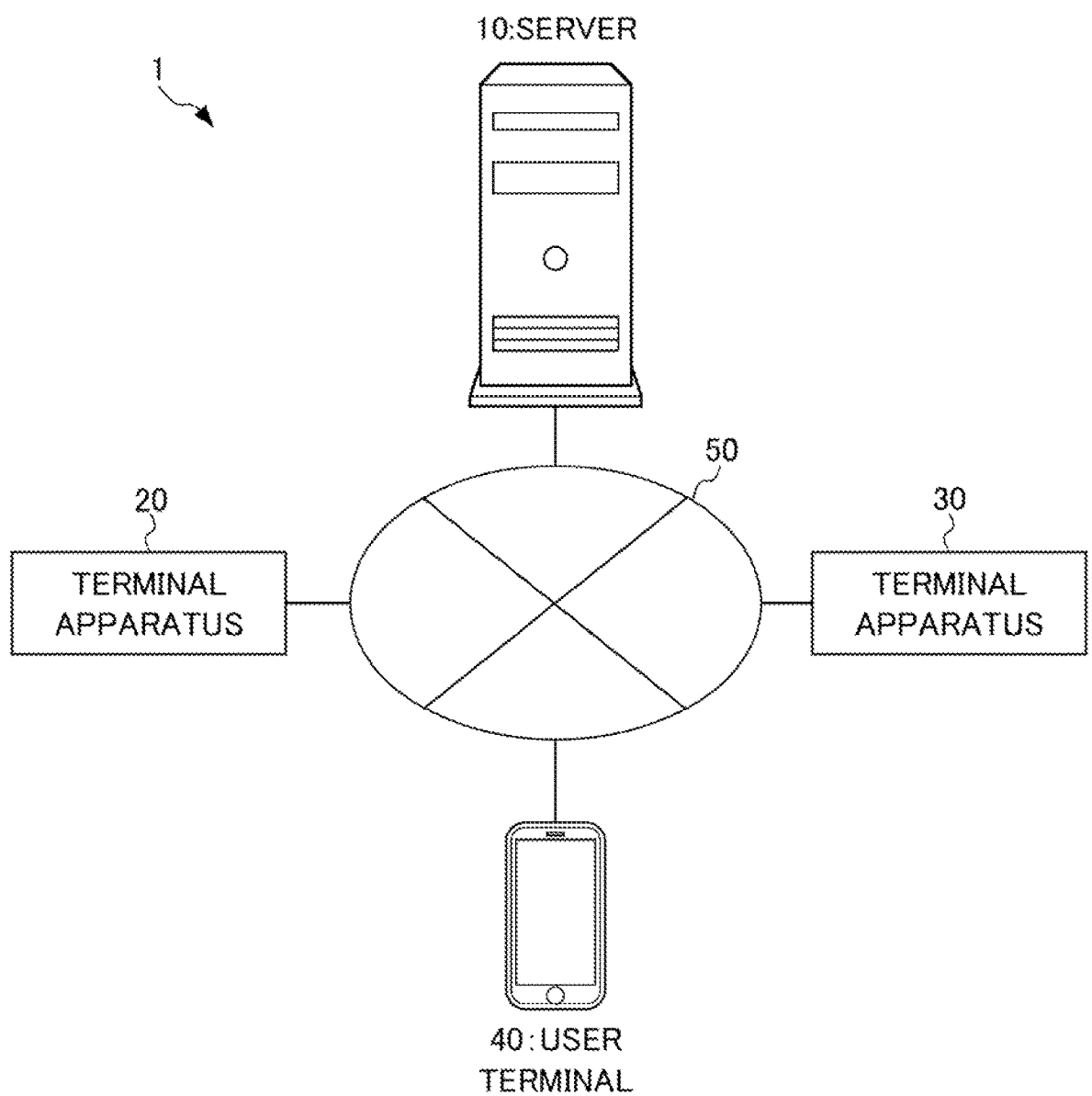
FIG. 1 is a block view illustrating a basic configuration of the entirety of a matching system which is an embodiment according to the present invention.

As illustrated in FIG. 1, a matching system 1 includes a server 10 held by an administrator who provides services in accordance with the matching system 1, a terminal apparatus 20 held by a used car dealer who owns at least one used BEV, a terminal apparatus 30 held by an owner who owns idle space, and a user terminal 40 held by a user who uses a BEV. The server 10, the terminal apparatus 20, the terminal apparatus 30, and the user terminal 40 are communicably connected to each other via a communication network 50 such as the internet or a mobile telephone network using a standard such as 4G or 5G. Note that, in FIG. 1, one terminal apparatus 20, one terminal apparatus 30, and one user terminal 40 are connected to the communication network 50, but a plurality of terminal apparatuses 20, a plurality of terminal apparatuses 30, and a plurality of user terminals 40 may be connected to the communication network 50.

<Outline of Processing>

Conventionally, for example, a used car dealer exhibits a used BEV (idle BEV) for sale, and periodically causes the used BEV to perform work (charging and discharging) in order to maintain the performance of the used BEV, until the used BEV is sold. However, it takes time and money for a used car dealer to cause each of a plurality of used BEVs to perform work (charging and discharging).

In contrast, even if the owner of idle space has, for example, a 100 V or 200 V power supply necessary to charge a BEV, cost would be incurred in installing an electrical power station for supplying power to a BEV in order to use the idle space.

A user who uses a BEV also desires to recharge the BEV as inexpensively as possible.

Accordingly, as described below, the matching system 1 according to the present invention matches a used BEV with an idle space in order to cause a used BEV (idle BEV) to be parked in an idle space, set the used BEV as a power-supply vehicle, and provide a vehicle-to-vehicle (V2V) power supply service to a user who uses a BEV. The matching system 1 can dispose the used BEV on the idle space on the basis of the matching result and provide the V2V power supply service to thereby solve the problem described above.

Before describing in detail each apparatus (device) which makes up the matching system 1, a brief description is given for an outline of processing by the matching system 1.

Firstly, a used car dealer as a device owner, via the terminal apparatus 20 for example, registers in advance to the server 10 information (for example, an initial position (address) of a used BEV, vehicle type, battery capacity (SOC), whether to have self-propelled dispatch at time of electrical depletion, etc.) pertaining to a used BEV the used car dealer desires to provide to the V2V power supply service and to have the V2V power supply service manage. The initial own vehicle position is used to minimize the cost of moving the used BEV to dispose the used BEV at the idle space, as described below. The vehicle type is used to match with a charging BEV. The battery capacity (SOC) is used in order to dispose the used BEV in order to maximize the amount of work, and to publish advertisements. Whether to have self-propelled dispatch at time of electrical depletion is used in order to set permission for use of an option for assistance when the user's BEV is electrically depleted.

As a storage location owner, the owner of idle space, via the terminal apparatus 30 for example, registers to the server 10 information (for example, a number of vehicles which can be parked, parking location information (address), a time period in which usage is possible, a contracted unit price of electricity, etc.) pertaining to idle space that already has a 100/200 V power supply and is capable of providing a V2V power supply service. Here, the number of vehicles which can be parked can be used to grasp the number of vehicles which can be disposed at the idle space. The parking position information is also used to minimize the cost of moving a used REV, and to match with a user's REV. The time period in which usage is possible can be used to visualize time in which it is possible to use services provided by the owner of the idle space. The contracted unit price of electricity can be used to grasp the electricity fee for charging a used BEV.

In order to use the V2V power supply service, a user who uses a BEV also, via the user terminal 40 for example, registers in advance to the server 10 information (for example, full name, address, email address, etc.) pertaining to the user and information pertaining to the BEV (for example, vehicle type, threshold for determining desire to charge, own vehicle position, etc.). Here, the vehicle type is used to match with a used BEV. The threshold for determining desire to charge (for example, less than or equal to SOC 30%, etc.) can be used to propose use of the V2V power supply service. The own vehicle position is used to search for a used BEV which can supply power.

In this manner, the used car dealer, the owner of idle space, and a user register to use the matching system 1, whereby the server 10 can collect and manage, for example, information regarding registered used BEVs, idle space, and users.

It may be that the server 10 according to the present invention, when providing the V2V power supply service based on registered information, matches at which idle space to dispose a registered used BEV, transmits a matching result to the terminal apparatus 20 and the terminal apparatus 30, and, via the terminal apparatus 20, charges a used car dealer an outsourcing operation fee for management of the used BEV.

Accordingly, the administrator of the V2V power supply service can acquire operation fees for the service. In the case Where the outsourcing operation fee is less expensive than the monetary amount for the used car dealer themselves to manage the used BEV, it is also possible for the used car dealer to manage the used BEV at a low cost. The used car dealer can also reduce exhibition space to thereby reduce facility maintenance costs.

The used car dealer, after paying the outsourcing operation fee, disposes (parks) a used BEV at a matched idle space to thereby start the V2V power supply service. Meanwhile, it may be that the owner of the idle space manages, for example, charging and discharging for a used BEV at the idle space, and, in order to provide V2V power supply free-of-charge or inexpensively to a user's BEV, notifies advertising information including service information such as a discount ticket which can be used at a facility such as a restaurant owned by the owner of the idle space to the user terminal 40 of the user who uses the V2V power supply service.

Accordingly, in exchange for managing charging and discharging for a used BEV in the idle space and providing V2V power supply free-of-charge or inexpensively, the owner of the idle space can get more users to use the facility and thereby achieve more profit.

In addition, a user who uses a BEV can use the V2V power supply service free-of-charge or inexpensively and use a store at less cost. By the spread of more locations where charging can be performed, the user can also be at ease without worrying about electrical depletion.

A simple description for the outline of processing by the matching system 1 was given above.

Next, description is given regarding each apparatus (device) which makes up the matching system 1.

<Server 10>

Figure 2:
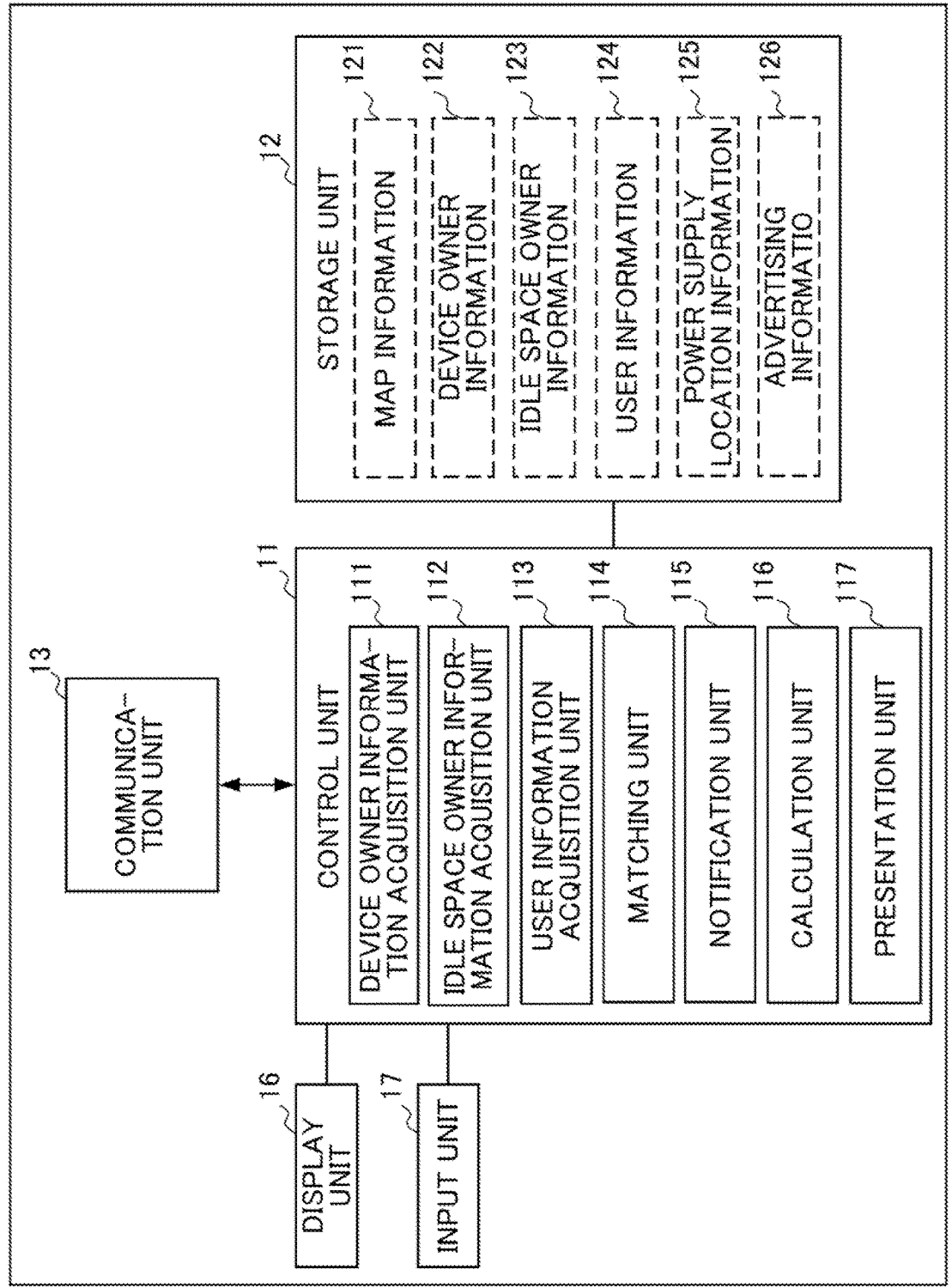
FIG. 2 is a functional block diagram illustrating a functional configuration of a server in an embodiment according to the present invention.

With reference to a block view in FIG. 2, description is given regarding functional blocks that the server 10 is provided with.

As illustrated in FIG. 2, the server 10 is configured by including a control unit 11, a storage unit 12, a communication unit 13, a display unit 16, and an input unit 17.

The control unit 11 is configured from an arithmetic processing apparatus such as a microprocessor, and controls each unit which makes up the server 10. Details of the control unit 11 are described below.

The storage unit 12 is configured by, for example, a semiconductor memory, and stores a control program referred to as firmware or an operating system; a program for acquiring from the terminal apparatus 20 device owner information regarding a used car dealer as a device owner who owns a device provided with a battery; a program for acquiring idle space owner information regarding an owner who owns idle space as a storage location for a used BEV; a program for performing matching processing for matching device owner information with storage location information included in idle space owner information; a program for, based on the matching processing, notifying location information regarding an idle space at which a used BEV is disposed to the user terminal 40 as power supply location information; and additionally various items of information such as map information. As information stored in the storage unit 12, for example map information 121, device owner information 122, idle space owner information 123, user information 124, power supply location information 125, and advertising information 126 are exemplified in FIG. 2.

The map information 121 includes information such as information pertaining to a feature such as a road, a facility, or a parking lot; road information; facility information; and parking lot information. As facility information and parking lot information, position information regarding a respective facility or parking lot is saved as latitude and longitude information. Note that, as position information regarding a respective facility or a parking lot, it may be that information such as an address or telephone number is stored in addition to latitude and longitude information.

The device owner information 122 includes, for example. Information regarding a device owner name including a company name of a used car dealer or the surname and given name of a representative of the used car dealer, an address, etc. Note that an owner identification ID for each used BEV owner may foe stored. The device owner information 122 may also include, for each used car dealer, information (for example an initial position (address) for the used BEV, a vehicle type, a battery capacity, etc.) pertaining to a used BEV provided to the V2V power supply service.

The idle space owner information 123 includes, for example, information regarding an owner name including a name of a facility which is an idle space owner or the surname and given name of a representative of the facility, an address, etc. Note that an owner identification ID for each idle space owner may be stored. The idle space owner information 123 may also include, for each idle space owner, information (for example, a number of vehicles which can be parked, parking location Information (address), a time period in which usage is possible, a contracted unit price of electricity, etc.) pertaining to the idle space as storage location information.

The user information 124 includes, for example, information regarding a username including a surname and a given name, a user address, etc. which are registered via the user terminal 40 in order to use the V2V power supply service. Note that a user identification ID may be stored for each user. Note that the user information 124 may include information (for example, a vehicle type, a threshold for determining desire to charge, an own vehicle position, etc.) pertaining to a BEV used by each user.

The power supply location information 125 includes location information such as the location (address) of idle space at which a used BEV is disposed, in accordance with matching between the device owner information 122 and information pertaining to the idle space which is included in the idle space owner information 123. In addition, it may be that the power supply location information 125 includes a record (for example, a number of charge/discharge times) for the supply of power from a used BEV disposed at a respective power supply location to a user's BEV.

The advertising information 126 includes service information such as a discount ticket to be notified to a user terminal 40 in order to have a user who uses a V2V power supply service use a facility such as a restaurant held by the owner of an idle space which provides the V2V power supply service.

The communication unit 13 has a digital signal processor (DSP), for example, and is compliant with a standard such as Long-Term Evolution (LTE), 4G, or 5G or a standard such as Wi-Fi (registered trademark) in order to realize wireless communication with the terminal apparatus 20, the terminal apparatus 30, and the user terminal 40 via the communication network 50.

The display unit 16 is configured by a display device such as a liquid crystal display or an organic electroluminescence panel. The display unit 16 displays an image after receiving an instruction from the control unit 11.

The input unit 17 is configured by, for example, an input apparatus (not illustrated) such as physical switches referred to as a numeric keypad or a touch panel overlappingly provided on the display surface of the display unit 16.

Next, details of the control unit 11 are described. The control unit 11 is, for example, configured by microprocessor having a CPU, RAM, ROM, I/O, etc. The CPU executes each program read out from the ROM or the storage unit 12, and at the time of execution thereof, reads out information from the RAM, ROM, and the storage unit 12, writes information to the RAM and the storage unit 12, and sends and receives signals to and from communication unit 13. In this manner, hardware and software (programs) collaborate, whereby processing according to the present embodiment is realized.

As illustrated in FIG. 2, the control unit 11 includes, as functional blocks, a device owner information acquisition unit 111, an idle space owner information acquisition unit 112, a user information acquisition unit 113, a matching unit 114, a notification unit 115, a calculation unit 116, and a presentation unit 117.

The device owner information acquisition unit 111, for example, acquires, via the terminal apparatus 20, information (a device owner name including a company name of a used car dealer or the surname and given name of a representative of the used car dealer, an address, etc.) pertaining to a used car dealer that, owns at least one used BEV to be provided to the V2V power supply service and to have the V2V power supply service manage. Note that the device owner information acquired by the device owner information acquisition unit 111 may include information (for example, the initial position (address) of the used BEV, the vehicle type, the battery capacity, etc.) pertaining to the used BEV. The device owner information acquisition unit ill stores acquired device owner information in the device owner information 122 for each used car dealer.

The idle space owner information acquisition unit 112, for example, acquires, via the terminal apparatus 30, information (an owner name Including a facility name or the surname and given name of a representative, an address, etc.) pertaining to an owner that owns an idle space at which it is possible to store two or more BEVs to provide to the V2V power supply service. Note that the idle space owner information acquired by the idle space owner information acquisition unit 112 may also include, for each idle space owner, information (for example, a number of vehicles which can be parked, parking location information (address), a time period in which usage is possible, a contracted unit price of electricity, etc.) pertaining to the idle space. The idle space owner information acquisition unit 112 stores the acquired idle space owner information in the idle space owner information 123, for each idle space owner.

The user information acquisition unit 113, for example via the user terminal 40, acquires information (a user name including a surname and a given name, a user address, etc.) pertaining to a user in order for the V2V power supply service to be used. Note that the user information acquired by the user information acquisition unit 113 may include information (for example, a vehicle type, a threshold for determining desire to charge, an own vehicle position, etc.) pertaining to a BEV used by the user. The user information acquisition unit 113 may store the acquired user information in the user information 124, for each user.

Note that it may be that the user information acquisition unit 113 acquires from the user terminal 40 an evaluation (for example, a five-grade evaluation, etc.) for a power supply location used by the user. In other words, the user information acquisition unit 113 may acquire from the user terminal 40 an evaluation of the power supply location, such as whether it was easy to use the power supply location, whether there was a sufficient number of used BEVs, or what service was used when the power supply location was used. It may be that the user information acquisition unit 113 stores the acquired user evaluation in the power supply location information 125, for each power supply location.

The matching unit 114 uses the device owner information 122 and the information pertaining to an idle space in the idle space owner information 123 in order to match a used BEV with an idle space at which to dispose the used BEV.

Specifically, the matching unit 114, for example, calculates the distance between the position of a used BEV and an idle space from the own vehicle position (for example, an address, latitude and longitude, etc.) of the used BEV included in the device owner information 122 and parking lot position information (for example, address, latitude and longitude, etc.) for the idle space which is included in the idle space owner information 123. From a perspective of minimizing movement cost, the matching unit 114 determines whether the calculated distance is shorter than a cruisable distance for the used BEV. In a case where the calculated distance is shorter than the cruisable distance for the used BEV, the matching unit 114 determines that a match has been established, and notifies a matching result to the terminal apparatus 20 and the terminal apparatus 30. For example, in a case where an outsourcing operation fee as a device storage fee calculated by the below-described calculation unit 116 with respect to a notified match is paid by a used car dealer, the matching unit 114 stores location information for the matched idle space in the power supply location information 125 in the storage unit 12 as power supply location information regarding a power supply location at which power supply from a used BEV is possible.

In contrast, in a case where the calculated distance is greater than or equal to the cruisable distance for the used BEV, the matching unit 114 performs matching by switching to a different used BEV or a different idle space.

The notification unit 115 notifies power supply location Information stored in the power supply location information 125 in the storage unit 12 to the user terminal 40 held by a user who uses a BEV.

Specifically, for example, in a case where a user who uses a BEV has executed on the user terminal 40 an application program such as a reservation program for making a reservation for V2V power supply service, the notification unit 115 notifies the power supply location information to the user terminal 40. The user terminal 40 may display the power supply location information together with a map on a display unit 46 described below which is, for example, a liquid crystal display included in the user terminal 40.

Figure 3A:
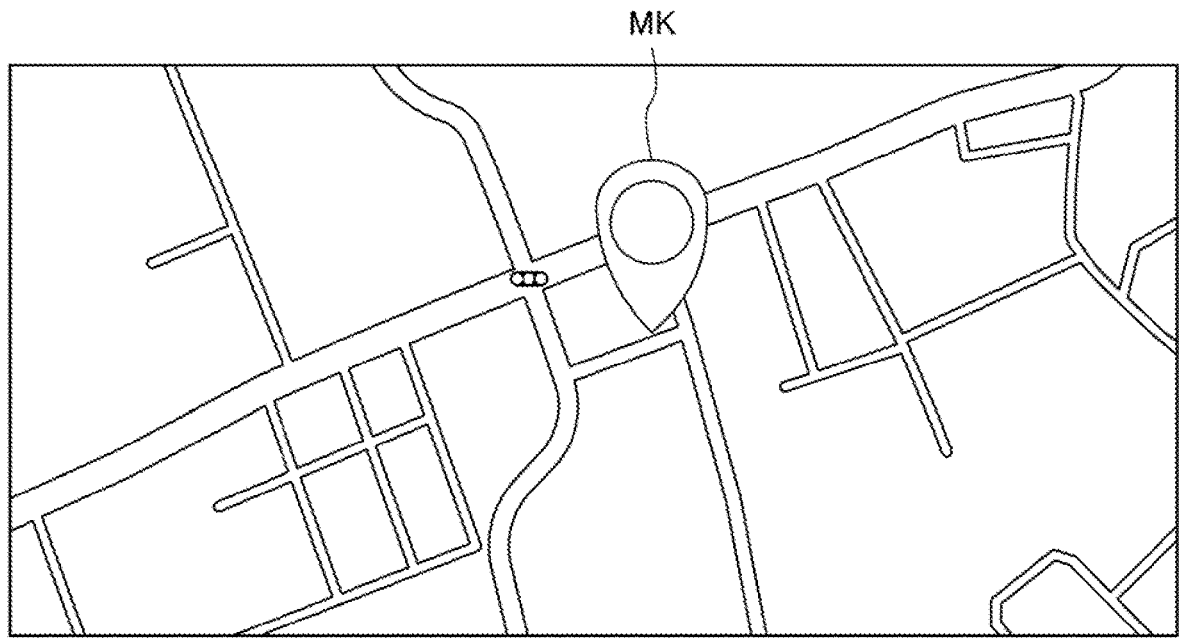
FIG. 3A is a view illustrating an example of display of power supply location information in an embodiment according to the present invention.

FIG. 3A is a view illustrating an example of display of power supply location information in the present embodiment.

As illustrated in FIG. 3A, an icon MK indicating power supply location information is displayed together with a map on the display unit 46 in the user terminal 40.

Figure 3B:
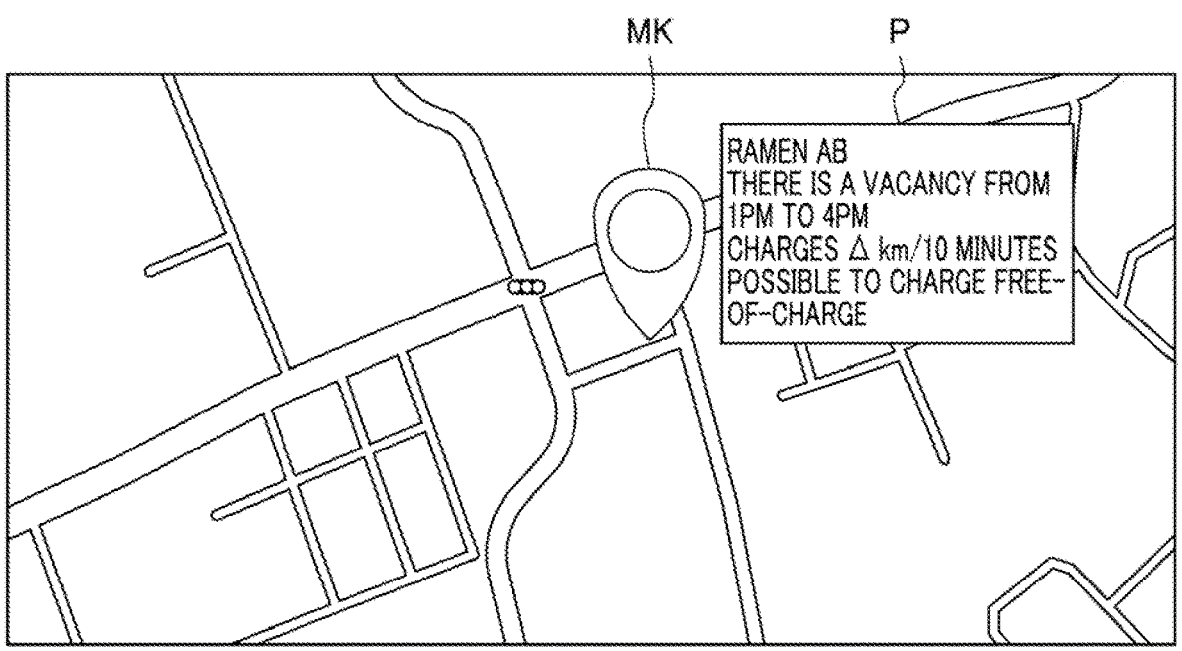
FIG. 3B is a view illustrating an example of display of power supply location information in an embodiment according to the present invention.

For example, in a case where an operation such as a user tapping on the icon MK is performed at the user terminal 40, the notification unit 115 acquires from the advertising information 126 advertising information including service information (for example, power supply is free-of-charge, etc.) for the power supply location corresponding to the icon MK which was subject to the operation. The notification unit 115 notifies the power supply location information and the advertising information to the user terminal 40. As illustrated in FIG. 3B, the user terminal 40 may display on the display unit 46 the icon MK together with a pop-up screen P indicating service details as advertising information.

In the case where the owner of an idle space is a lodging facility, the notification unit 115 may also notify the power supply location information and the advertising information to the user terminal 40 in a case where the user terminal 40 has visited a reservation site for the lodging facility or a reservation site for the lodging facility at a travel agent. Accordingly, the user can confirm, on the reservation site, advertising information for benefits (for example, "you can charge your car for free for one night") to be received at the lodging facility.

The calculation unit 116 calculates an outsourcing operation fee to charge the used car dealer, in accordance with a record (for example, a number of times charging and discharging has been performed) for the supply of power from a used BEV to a user's BEV, with the record being stored in the power supply location information 125 in the storage unit 12.

Specifically, an outsourcing operation fee for each month is set in advance to a predetermined monetary amount which is lower than the cost for the used car dealer to manage the used BEV themselves, for example. Accordingly, the used car dealer can be motivated, to provide the used BEV to the V2V power supply service.

It may be that the calculation unit 116 calculates the outsourcing operation fee to be lower than the predetermined monetary amount by a discount rate that corresponds to the number of charge/discharge times for the used BEV, and charges the used car dealer the calculated outsourcing operation fee. In other words, in accordance with a greater number of times charging and discharging has been performed, deterioration of the battery in the used BEV advances, and the value of the used BEV decreases. Accordingly, the calculation unit 116 may calculate the outsourcing operation fee to be discounted in accordance with the number of times charging and discharging has been performed for the used BEV.

Based on the record (for example, the number of times charging and discharging has been performed) for the supply of power by the used BEV in the power supply location information 125, the presentation unit 117 presents, to the terminal apparatus 20, other idle space owner information for the used car dealer to which the used BEV belongs.

Specifically, for example, based on the record (for example, the number of times charging and discharging has been performed) for the supply of power from the used BEV in the power supply location information 125, the presentation unit 117 presents to the terminal apparatus 20 idle space owner information regarding another idle space in a case where a record for the other idle space is greater than a record for the current idle space. Accordingly, although deterioration of the battery in the used BEV will advance, the used car dealer can suppress the outsourcing operation fee by disposing the used BEV at an idle space which is used more often. Meanwhile, more used BEVs will be provided to the V2V power supply service, and thus the administrator of the matching system 1 should be able to expand the service and increase profits.

In addition, it may be that the presentation unit 117 accumulates, in a cloud, data regarding power, supply locations, power supply times, used BEV vehicle types, and levels of battery deterioration which are acquired from the V2V power supply service and causes this data to be learned; or integrates a system for users to evaluate the service.

For example, it may be that the presentation unit 117 presents the terminal apparatus 30 held by the idle space owner with an analysis result such as the amount of time a facility user stays at a particular location or type of facility extends by X hours on average or a user evaluation. Accordingly, for example, there is an incentive for the idle space owner in that improved user evaluations will lead to more visitors to the idle space, and therefore the idle space owner can increase the number of used BEV vehicle types they accept or extend service times.

In addition, it may be that the presentation unit 117 presents the terminal apparatus 20 held by the used car dealer with vehicle types for which there is a large number of times charging and discharging has been performed, in other words vehicle types for which the outsourcing operation fee is less expensive. Accordingly, the used car dealer can determine vehicle types for which they wish to proactively outsource operation, and will more proactively supply used BEVs because the outsourcing operation fee will decrease the more that a used BEV is used in the V2V power supply service.

<Terminal Apparatus 20>

The terminal apparatus 20 is, for example, used by the used car dealer to communicate with the server 10. A publicly known terminal such as a PC, tablet terminal, smartphone, or portable terminal, for example, may be used as the terminal apparatus 20.

FIG. 4 is a functional block diagram illustrating a functional configuration of the terminal apparatus 20. As illustrated in FIG. 4, the terminal apparatus 20 is configured by Including at least a control unit 21 and a storage unit 22, as well as a communication unit 23, a display unit 26, and an input unit 27 which are outside of the control unit 21 and the storage unit 22.

Here, the control unit 21, the storage unit 22, the communication unit 23, the display unit 26, and the input unit 27 are realized by functional blocks with the same names as that included in the above-described server 10 and hardware equivalent to that included in the above-described server 10, but are different from the above-described server 10 in function and intended use. Accordingly, subsequent duplicate description of hardware is partially omitted, and description is given below regarding different functions and intended uses.

The control unit 21 is configured from an arithmetic processing apparatus such as a microprocessor, and controls each unit which makes up the terminal apparatus 20. Details of the control unit 21 are described below.

The storage unit 22 is configured by, for example, a semiconductor memory, and may store various programs such as a control program referred to as firmware or an operating system or a program for registering device owner information regarding a used car dealer and information pertaining to a used BEV to the server 10. It may also be that the storage unit 22 stores various items of information which is registered to the server 10.

The communication unit 23 has a digital signal processor (DSP), for example, and is compliant with a standard such as Long-Term Evolution (LTE), 4G, or 5G or a standard such as Wi-Fi (registered trademark) in order to realize wireless communication with, for example, the server 10 via the communication network 50.

The display unit 26 is configured by a display device such as a liquid crystal display or an organic electroluminescence panel. The display unit 26 displays an image after receiving an instruction from the control unit 21.

The input unit 27 is configured by, for example, an input apparatus (not illustrated) such as physical switches referred to as a keyboard or a numeric keypad, or a touch panel overlappingly provided on the display surface of the display unit 26.

Next, details of the control unit 21 are described. The control unit 21 is, for example, configured by microprocessor having a CPU, RAM, ROM, I/O, etc. The CPU executes each program read out from the ROM or the storage unit 22, and at the time of execution thereof, for example reads out information from the RAM, ROM, and the storage unit 22, writes information to the RAM and the storage unit 22, and sends and receives signals to and from the communication unit 23, the display unit 26, and the input unit 27. In this manner, hardware and software (programs) collaborate, whereby processing according to the present embodiment is realized.

As illustrated in FIG. 4, the control unit 21 is provided with a registration unit 211.

The registration unit 211 registers device owner information to the server 10 in order to provide the V2V power supply service with a used BEV for which management is desired, as described above. Specifically, via the communication unit 13, the registration unit 211 registers to the server 10 device owner information which includes information such as a used car dealer name or a device owner name including a surname and a given name of a representative of the used car dealer, and an address, with the device owner information being inputted by the used car dealer via the input unit 27. It may also be that the registration unit 211 registers in the server 10 information (for example, initial used BEV position (address), vehicle type, battery capacity, etc.) pertaining to a used BEV to be provided to the V2V power supply service and managed.

Note that, for example in the case where the used BEV is sold, the registration unit 211 may transmit to the server 10 a deletion instruction for deleting information regarding the used BEV from the device owner information 122 in the server 10. In this case, it may be that the server 10 stops new reservations for the power supply location (idle space) at which the used BEV is disposed after a predetermined time period (for example, one week, etc.) after receiving the deletion instruction. It may be that, after the predetermined time period (for example, one week, etc.) has elapsed, the server 10 then deletes information regarding the used BEV for which the deletion instruction was performed from the device owner information 122 and deletes the idle space at which the used BEV was disposed from power supply location information 125. A used car dealer may also move the used BEV from the idle space before the predetermined time period elapses.

<Terminal Apparatus 30>

The terminal apparatus 30 is for an idle space owner to, for example, communicate with the server 10. A publicly known terminal such as a PC, tablet terminal, smartphone, or portable terminal, for example, may be used as the terminal apparatus 30.

FIG. 5 is a functional block diagram illustrating a functional configuration of the terminal apparatus 30. As illustrated in FIG. 5, the terminal apparatus 30 is configured by including at least a control unit 31 and a storage unit 32, as well as a communication unit 33, a display unit 36, and an input unit 37 which are outside of the control unit 31 and the storage unit 32.

Here, the control unit 31, the storage unit 32, the communication unit 33, the display unit 36, and the input unit 37 are realized by functional blocks with the same names as that included in the above-described server 10 and hardware equivalent to that included in the above-described server 10, but are different from the above-described server 10 in function and intended use. Accordingly, subsequent duplicate description of hardware is partially omitted, and description is given below regarding different functions and intended uses.

The control unit 31 is configured from an arithmetic processing apparatus such as a microprocessor, and controls each unit which makes up the terminal apparatus 30. Details of the control unit 31 are described below.

The storage unit 32 is configured by, for example, a semiconductor memory, and may store various programs such as a control program referred to as firmware or an operating system or a program for performing processing for registering idle space owner information regarding an owner that owns an idle space and information pertaining to the idle space to the server 10. It may also be that the storage unit 32 stores various items of information which is registered to the server 10.

The communication unit 33 has a digital signal processor (DSP), for example, and is compliant with a standard such as Long-Term Evolution (LTE), 4G, or 5G or a standard such as Wi-Fi (registered trademark) in order to realize wireless communication with, for example, the server 10 via the communication network 50.

The display unit 36 is configured by a display device such as a liquid crystal display or an organic electroluminescence panel. The display unit 36 displays an image after receiving an instruction from the control unit 31.

The input unit 37 is configured by, for example, an input apparatus (not illustrated) such as physical switches referred to as a keyboard or a numeric keypad, or a touch panel overlappingly provided on the display surface of the display unit 36.

Next, details of the control unit 31 are described. The control unit 31 is, for example, configured by microprocessor having a CPU, PAM, ROM, I/O, etc. The CPU executes each program read out from the ROM or the storage unit 32, and at the time of execution thereof, for example reads out information from the RAM, ROM, and the storage unit 32, writes information to the RAM and the storage unit 32, and sends and receives signals to and from the communication unit 33, the display unit 36, and the input unit 37. In this manner, hardware and software (programs) collaborate, whereby processing according to the present embodiment is realized.

As illustrated in FIG. 5, the control unit 31 is provided with a registration unit 311.

As described above, the registration unit 311 registers idle space owner information to the server 10 in order to provide an idle space as a parking location (storage location) for a used BEV provided to the V2V power supply service. Specifically, via the communication unit 13, the registration unit 311 registers to the server 10 the idle space owner information which includes information such as a facility name or an owner name including a surname and a given name of a representative, and an address, with the idle space owner information being inputted by the idle space owner via the input unit 37. It may also be that the registration unit 311 registers to the server 10 information (for example, a number of vehicles which can be parked, parking location information (address), a time period in which usage is possible, a contracted unit price of electricity, etc.) pertaining to idle space that has a 100/200 V power supply and is capable of providing a V2V power supply service.

<User Terminal 40>

The user terminal 40 is for a user who uses a BEV to communicate with the server 10, for example. A publicly known terminal such as a PC, tablet terminal, smartphone, or portable terminal, for example, may be used as the user terminal 40.

Figure 6:
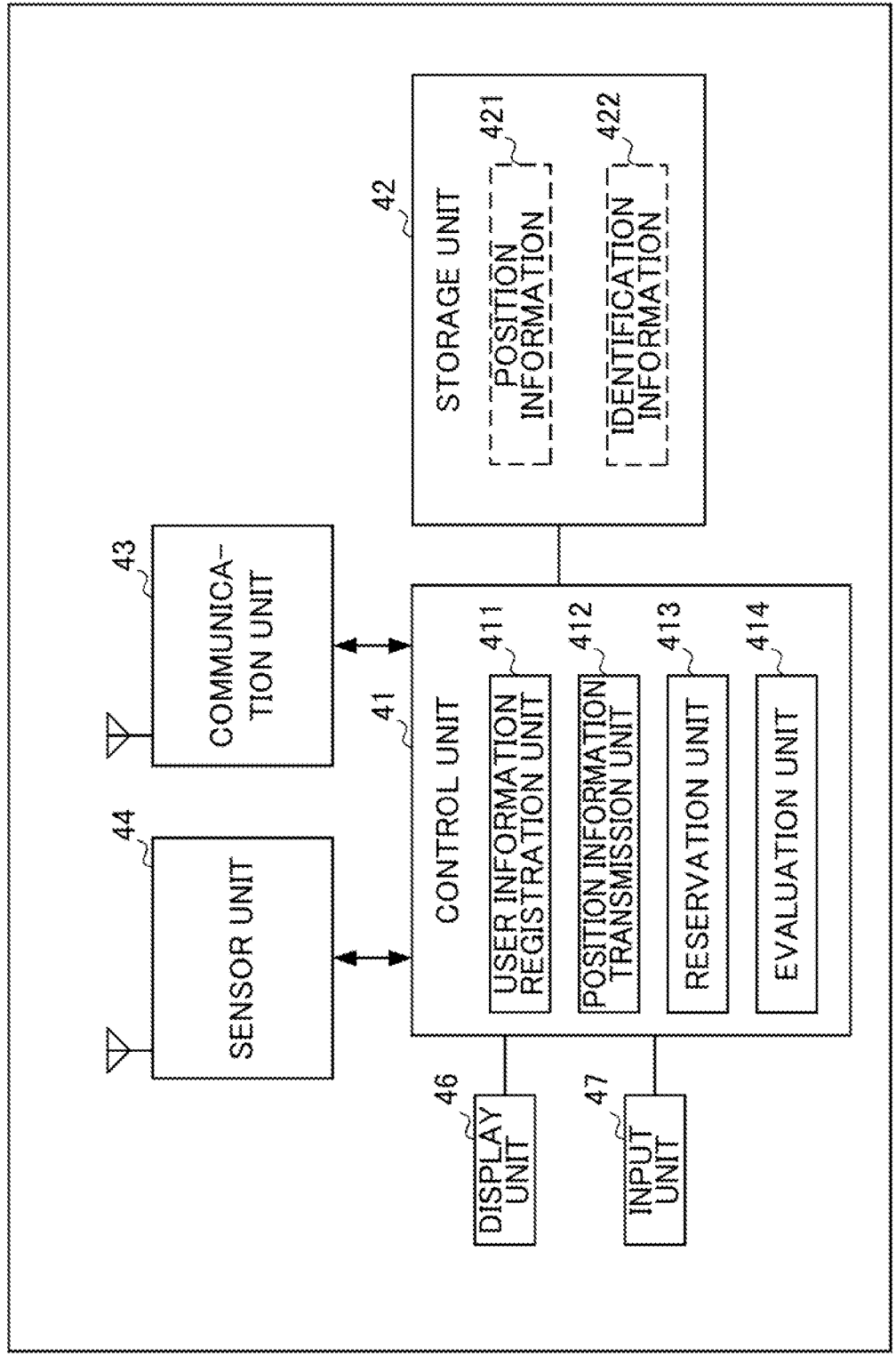
FIG. 6 is a functional block diagram illustrating a functional configuration of a user terminal in an embodiment according to the present invention.

FIG. 6 illustrates a functional block diagram illustrating a functional configuration of the user terminal 40.

As illustrated in FIG. 6, the user terminal 40 is configured by including at least a control unit 41 and a storage unit 42, as well as a communication unit 43, a sensor unit 44, a display unit 46, and an input unit 47 which are outside of the control unit 41 and the storage unit 42.

Here, the control unit 41, the storage unit 42, the communication unit 43, the display unit 46, and the input unit 47 are realized by functional blocks with the same names as that included in the above-described server 10 and hardware equivalent to that included in the above-described server 10, but are different from the above-described server 10 in function and intended use. Accordingly, subsequent duplicate description of hardware is partially omitted, and description is given below regarding different functions and intended uses.

The control unit 41 is configured from an arithmetic processing apparatus such as a microprocessor, and controls each unit which makes up the user terminal 40. Details of the control unit 41 are described below.

The storage unit 42 is configured by, for example, a semiconductor memory, and stores various programs such as a control program referred to as firmware or an operating system, a program for transmitting position information to the server 10, a program for registering to the server 10 information pertaining to a user and information pertaining to a BEV being used, a program for using the V2V power supply service based on a reservation for the V2V power supply service or a registered charging condition, and a program for evaluating the V2V power supply service, and additionally various items of information such as map information. In FIG. 6, position information 421 and identification information 422 are illustrated as information stored by the storage unit 42.

The position information 421 is position information for the user terminal 40 (in other words, position information for the BEV), positioned by the sensor unit 44 which is described below. The position information 421 is made to include a time (date and time information) at which positioning was performed, and not only information indicating a positioned position.

In addition, the identification information 422 is for identifying the user terminal 40 (in other words, the BEV). As the identification information 422, it is possible to use, for example, a manufacturing number or MAC address which are uniquely allocated to the user terminal 40. It is also possible to use, as the identification information 422, a telephone number assigned to a subscriber identity module (SIM) inserted into the communication unit 43 in order for the communication unit 43 to connect to the communication network 50 which is a network such as a mobile telephone network. It is also possible to use, as the identification information 422, a vehicle identification number (VIN) or a license plate number which are specifically assigned to the BEV.

There may be a configuration in which each item of information stored in the storage unit 42 is stored in the storage unit 42 in advance, or there may be a configuration in which each item of information stored in the storage unit 42 is appropriately downloaded as necessary from, for example, a server apparatus (not illustrated) connected to the communication network 50. Each item of information stored in the storage unit 42 may also be appropriately corrected in response to user input, etc.

The communication unit 43 has a digital signal processor (DSP), for example, and is compliant, with a standard such as Long-Term Evolution (LTE), 4G, or 5G and a standard such as Wi-Fi (registered trademark) in order to realize wireless communication with, for example, the server 10 via the communication network 50.

The sensor unit 44 is configured by, for example, a Global Positioning System (GPS) sensor, a gyro sensor, an acceleration sensor, etc. The sensor unit 44 is provided with a function for detecting position information, and positions position information (latitude and longitude) for the user terminal 40 by the GPS sensor receiving a GPS satellite signal. Positioning by the sensor unit 44 is performed at a predetermined time interval (for example, at an interval of three seconds). The positioned position information 421 is stored in the storage unit 42 as position information 421.

Note that it is also possible for the sensor unit 44 to further improve the positioning accuracy of position information for the user terminal 40 based on an angular velocity or acceleration measured by a gyro sensor or an acceleration sensor.

It is also possible for the sensor unit 44 to calculate position information for the user terminal 40 in accordance with base station information acquired from the communication unit 43 using Assisted Global Positioning System (AGPS) communication, in a case where GPS communication is difficult or not possible.

The display unit 46 is configured by a display device such as a liquid crystal display or an organic electroluminescence panel. The display unit 46 displays an image after receiving an instruction from the control unit 41.

The input unit 47 is configured by, for example, an input apparatus (not illustrated) such as physical switches referred to as a numeric keypad or a touch panel overlappingly provided on the display surface of the display unit 46.

Next, details of the control unit 41 are described. The control unit 41 is, for example, configured by microprocessor having a CPU, RAM, ROM, I/O, etc. The CPU executes each program read out from the ROM or the storage unit 42, and at the time of execution thereof, for example reads out information from the RAM, ROM, and the storage unit 42, writes information to the RAM and the storage unit 42, and sends and receives signals to and from the communication unit 43, the sensor unit 44, the display unit 46, and the input unit 47. In this manner, hardware and software (programs) collaborate, whereby processing according to the present embodiment is realized.

As illustrated in FIG. 6, the control unit 41 is provided with a user information registration unit 411, a position information transmission unit 412, a reservation unit 413, and an evaluation unit 414.

The user information registration unit 411 registers user information to the server 10 in order to use the V2V power supply service, as described above. Specifically, the user information registration unit 411, via the communication unit. 43, registers to the server 10 user information (for example, full name, address, email address, etc.) and information pertaining to the BEV (for example, vehicle type, threshold for determining desire to charge, own vehicle position, etc.), which are inputted by the user via the input unit 47.

The position information transmission unit 412, by wireless communication using the communication unit 43, transmits to the server 10 the position information 421 and the identification information 422 stored in the storage unit 42.

Transmission of the position information 421 and the identification information 422 to the server 10 by the position information transmission unit 412 is periodically performed while the user is driving the BEV. For example, transmission is performed in real time each time the sensor unit 44 performs positioning at the predetermined time interval (for example, an interval of three seconds). It may be that, instead of transmitting to the server 10 in real time, a plurality of items of information are combined (for example, the position information 421 and the identification information 422 which have been updated at an interval of three seconds over three minutes are combined) and transmitted at once. In other words, it may be that there is so-called burst transmission.

At an occasion of using the V2V power supply service, the reservation unit 413 inputs a power supply location and time for which there is a desire to make a reservation based on an input operation by the user, via the input unit 47, and transmits reservation information regarding the inputted power supply location and time to the server 10 to thereby make a reservation for the V2V power supply service.

Specifically, for example, the reservation unit 413 inputs (selects) a power supply location and time for which there is a desire to make a reservation in a reservation site for the V2V power supply service displayed on the display unit 46 while confirming the map and advertising information (in particular, charging information "Δkm/10 minutes", etc.) in FIG. 3B, and transmits reservation information regarding the inputted (selected) power supply location and time to the server 10 via the communication unit 43. The server 10 makes the reservation information for the inputted (selected) power supply location and time based on the received reservation information.

For example, while the user is driving the BEV, the server 10 may determine whether the SOC of the battery in the BEV has become less than or equal to a registered threshold for determining desire to charge (for example, SOC 30%, etc.), based on the position information 421 and the Identification information 422 received from the user terminal 40. It may be that, in a case where the SOC of the battery in the BEV has become less than or equal to the threshold for determining desire to charge, the server 10, based on the position information and power supply location information 125 regarding the BEV which are received from the user terminal 40, searches for a match for a power supply location which has no reservation and is within the range of a cruisable distance back-calculated from a most recent electrical consumption, and transmits a search result to the user terminal 40. It may be that the reservation unit 413, for example, displays the received search result on the display unit 46 with a message "Charging needed soon. There is a location where you can charge nearby. Would you like to make a reservation?" and. Note that the message may be outputted as audio via a speaker (not illustrated) included in the user terminal 40.

Accordingly, the user can reliably make a reservation with the V2V power supply service before the BEV incurs electrical depletion, and can avoid electrical depletion.

The evaluation unit 414 accepts an evaluation for a power supply location based on an input operation by the user via the input unit 47, and transmits evaluation information regarding the accepted evaluation to the server 10.

Figure 7:
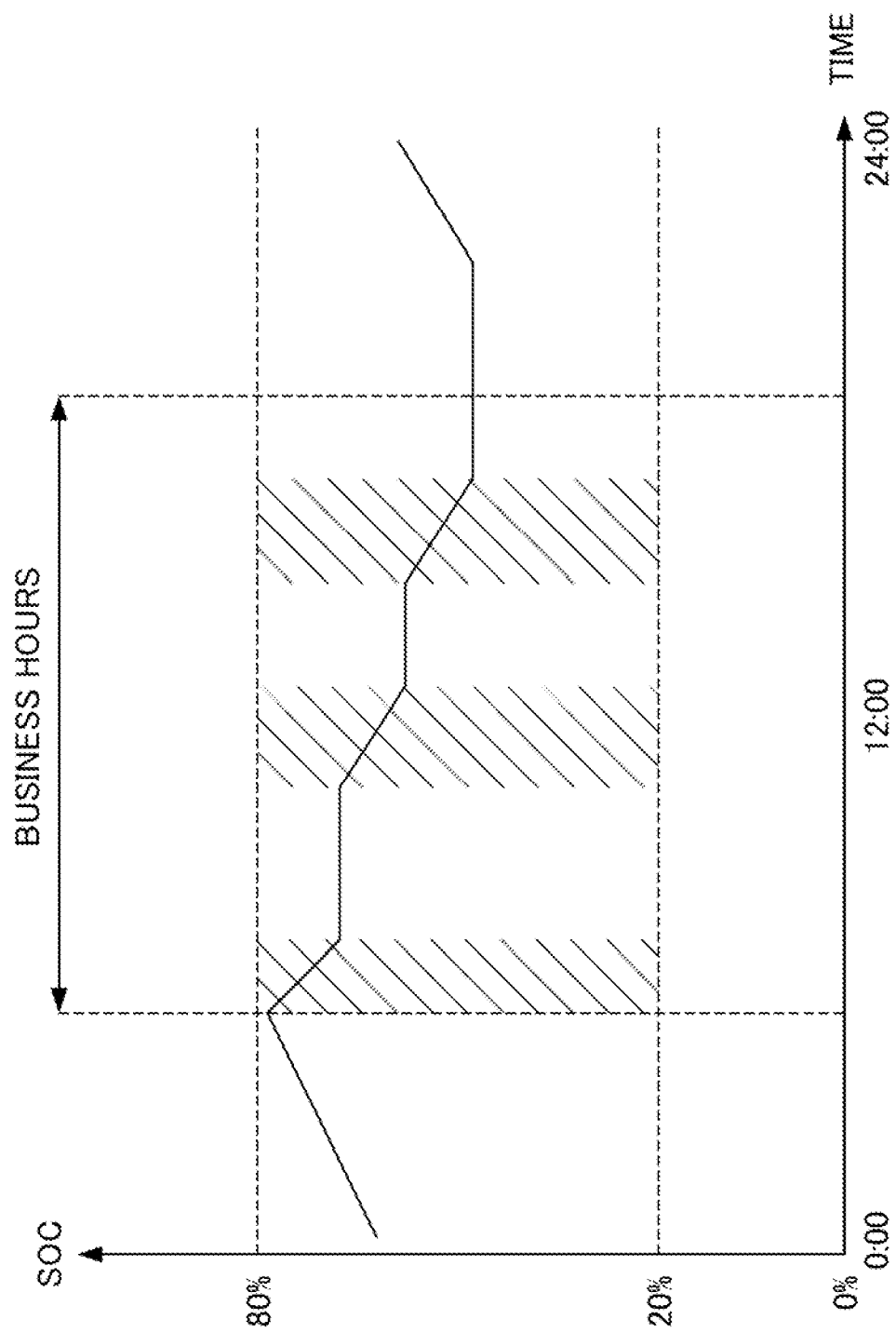
FIG. 7 is a view illustrating an example of charging and discharging operation with respect to a used BEV in an embodiment according to the present invention.
Figure 8:
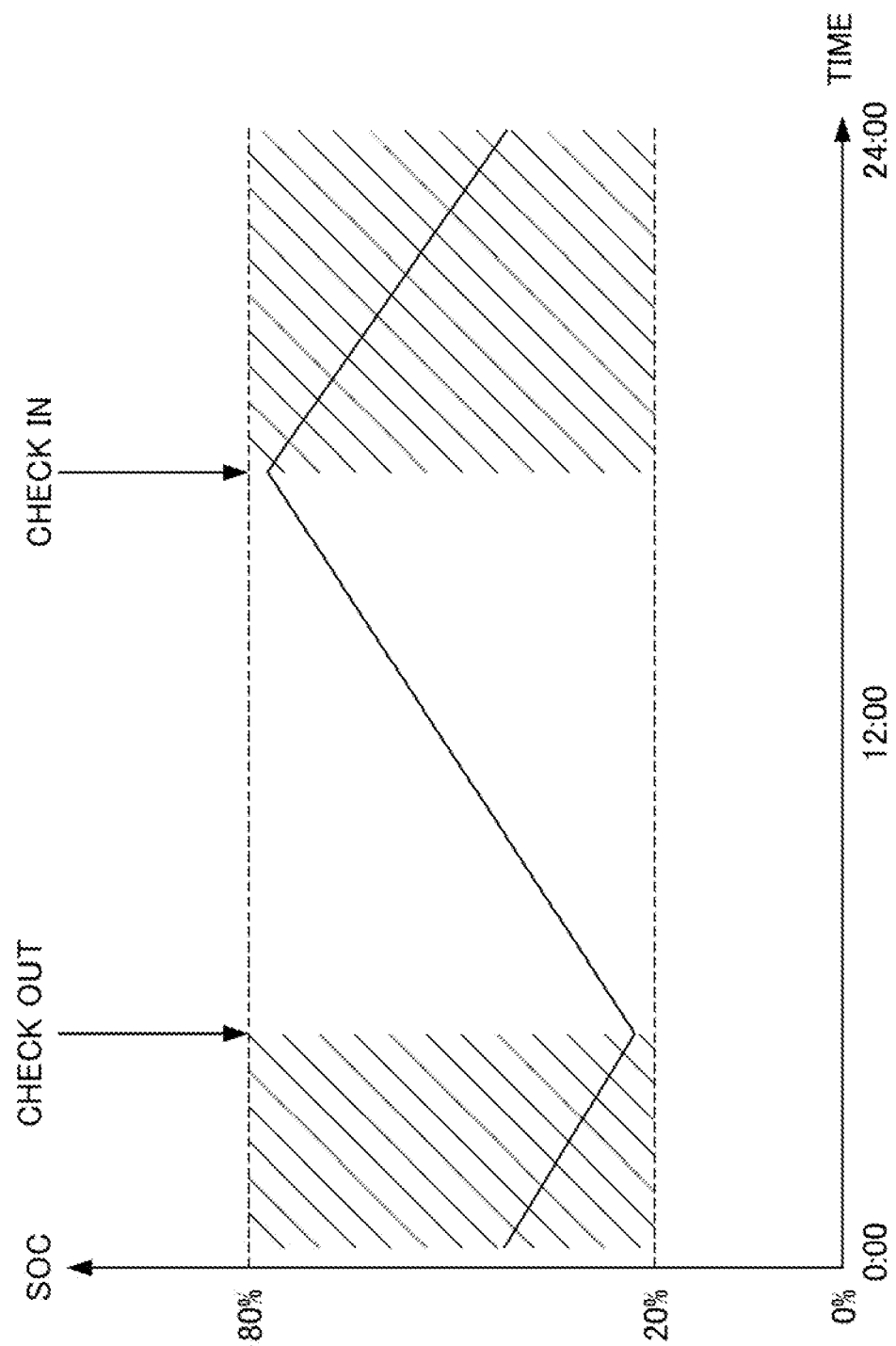
FIG. 8 is a view illustrating an example of charging and discharging operation with respect to a used BEV in an embodiment according to the present invention.

Next, with reference to FIGS. 7 and 8, description is given regarding operation by the owner of an idle space for charging and discharging a used BEV disposed at the idle space (a power supply location).

FIG. 7 illustrates an example of operations for charging and discharging a used BEV in a case where a user's BEV is parked in an idle space for a short term such as 30 minutes to one hour or parked in the idle space for a medium term such as for several hours. FIG. 8 illustrates an example of operations for charging and discharging a used BEV in a case where a user's BEV is parked in an idle space for a long term in units of days.

As illustrated in FIG. 7, in a case where the owner of an idle space is a facility such as a restaurant, a supermarket, a shopping center, or an attraction facility, the V2V power supply service is provided only during business hours for the restaurant, etc. In other words, from among the business hours of the facility held by the owner of the idle space, a used BEV in the case of FIG. 7 supplies power to BEVs for three respective users in periods of time indicated by shading. For example, it may be that the owner of the idle space charges the battery in the used BEV during a period of time late at night when the electricity fee is most inexpensive after business ends and before business starts the next day. Accordingly, the owner of the idle space can charge the used BEV with a low electricity fee.

Note that, as illustrated in FIG. 7, it is desirable for operation to be performed with the SOC (solid line) of the battery in the used BEV between 20% and 80% from a perspective of suppressing deterioration.

In contrast, in a case where the owner of an idle space is a facility such as a lodging facility or a camp site, as illustrated in FIG. 8, the V2V power supply service is provided in a duration from when a user checks in until the user checks out, as indicated by shading. For example, in a case where equipment such as a solar panel is already at a facility such as a lodging facility, the owner of idle space can charge the battery In the used BEV by surplus electrical power during the day, and can suppress the electricity fee.

Note that, as illustrated in FIG. 8, similarly to the case in FIG. 7, it is desirable for operation to be performed with the SOC (solid line) of the battery in the used BEV between 20% and 80% from a perspective of suppressing deterioration.

<Operation in Accordance with the Present Embodiment>

Figure 9:
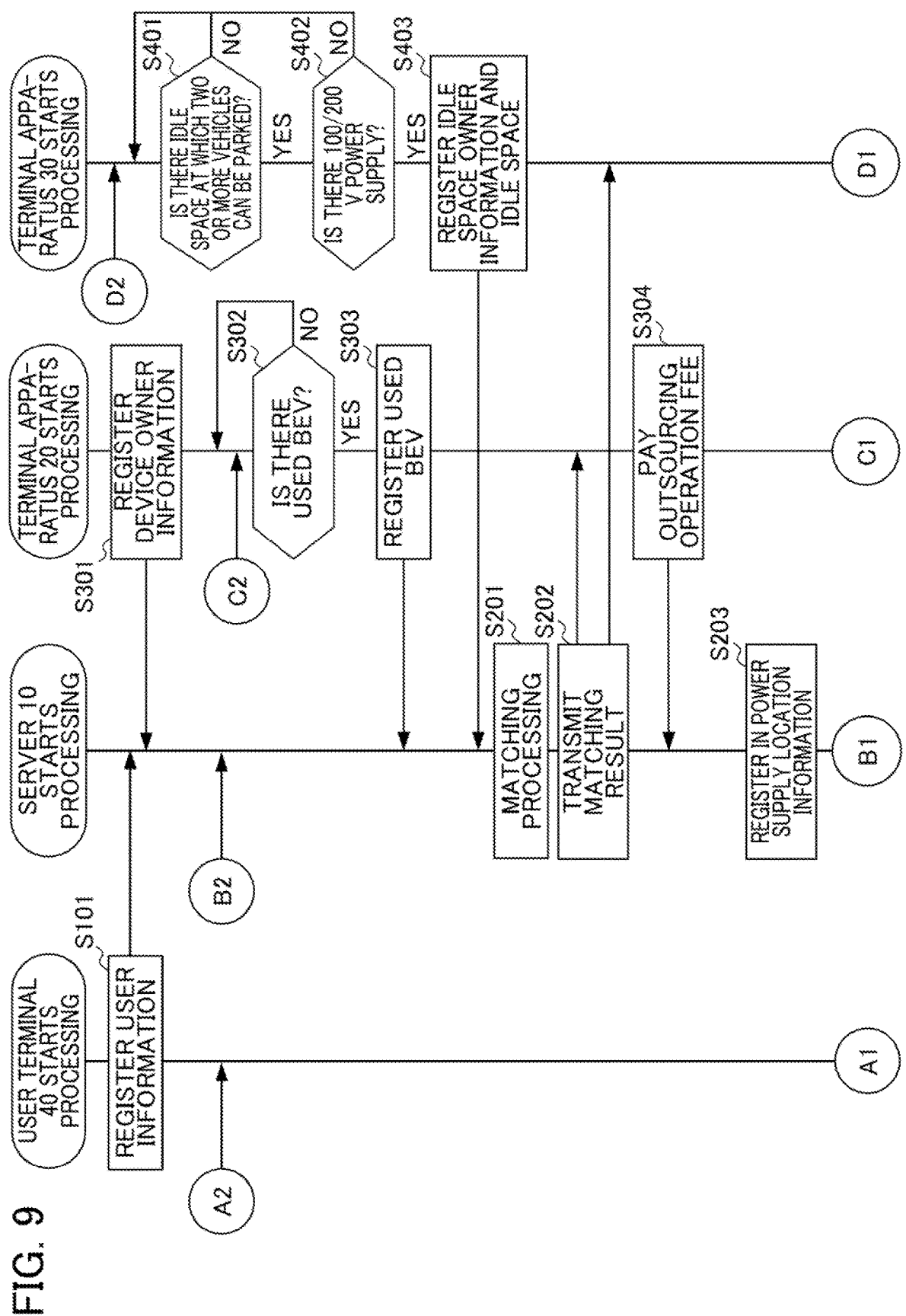
FIG. 9 is a flow chart for processing by a matching system 1 in an embodiment according to the present invention.
Figure 10:
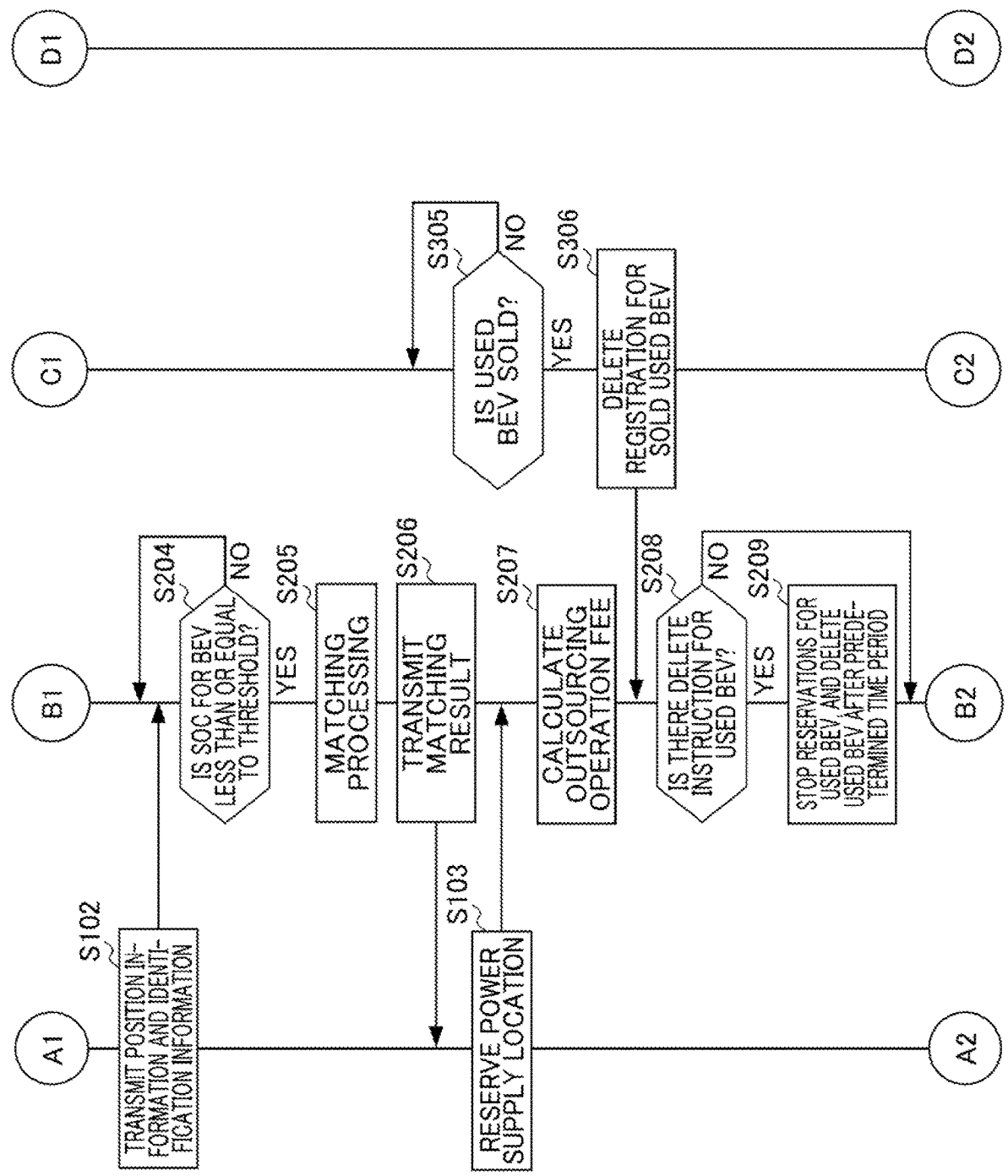
FIG. 10 is a flow chart for processing by the matching system 1 in an embodiment according to the present invention.

Next, with reference to flow charts in FIGS. 9 and 10, description is given regarding operation according to the present embodiment.

FIGS. 9 and 10 are flow charts for processing in the matching system 1 for describing the relationship between processing by the user terminal 40, processing by the server 10, processing by the terminal apparatus 20, and processing by the terminal apparatus 30.

Note that, in the following description, reservation processing for reserving a power supply location while a user is driving a BEV is exemplified, but it is similar for reservation processing for a user to reserve a power supply location in advance.

As illustrated in FIG. 9, in step S101, in order to use the V2V power supply service, the user terminal 40 (the user information registration unit 411) registers, to the server 10, information (for example, full name, address, email address, etc.) pertaining to the user and information pertaining to the BEV (for example, vehicle type, threshold for determining desire to charge, own vehicle position, etc.) which are inputted by the user via the input unit 47.

In step S301, the terminal apparatus 20 (the registration unit 211) registers, to the server 10, a device owner name which includes a used car dealer name or the surname and given name of a representative and is inputted by the used car dealer via the input unit 27 in order to provide the V2V power supply service with a used BEV for which management is desired.

In step S302, the terminal apparatus 20 determines whether there is a used BEV which can be provided to the V2V power supply service based on input by the used car dealer via the input unit 27. In a case where there is a used BEV, the processing proceeds to step S303. In contrast, in a case where there is no used BEV, the processing returns to step S302.

In step S303, the terminal apparatus 20 (the registration unit 211) registers, to the server 10, information (for example, initial used BEV position (address), vehicle type, battery capacity, etc.) which pertains to a used BEV and is inputted by the used car dealer via the input unit 27.

In step S401, in order to provide an idle space to the V2V power supply service, the terminal apparatus 30 determines, based on input by the owner of the idle space via the input unit 37, whether there is an idle space at which two or more vehicles can be parked. In a case where there is an idle space at which two or more vehicles can be parked, the processing proceeds to step S402. In contrast, in a case where there is no idle space at which two or more vehicles can be parked, the processing returns to step S401.

In step S402, in order to provide the idle space to the V2V power supply service, the terminal apparatus 30 determines, based on input by the owner of the idle space via the input unit 37, whether there is 100/200 V charging equipment at the idle space. In a case where there is 100/200 V charging equipment, the processing proceeds to step S403. In contrast, in a case where there no 100/200 V charging equipment, the processing returns to step S401.

In step S403, the terminal apparatus 30 (the registration unit 311) registers, to the server 10, idle space owner information which includes information such as a facility name or an owner name including a surname and a given name of a representative, and an address, and information (for example, a number of vehicles which can be parked, parking location information (address), a time period in which usage is possible, a contracted unit price of electricity, etc.) pertaining to the idle space, which are inputted by the idle space owner via the input unit 37.

In step S201, the server 10 (the matching unit 114) uses the device owner information 122 and the parking location information (address) in the idle space owner information 123 in order to match a used BEV with an idle space at which to dispose the used BEV.

In step S202, the server 10 (the matching unit 114) determines that the matching in step S201 has been established, and notifies a result that the matching has been established to the terminal apparatus 20 held by the used car dealer who has a used BEV and the terminal apparatus 30 held by the idle space owner. In this case, the server 10 (the calculation unit 116) charges the outsourcing operation fee to the terminal apparatus 20.

In step S304, the terminal apparatus 20 pays an outsourcing operation fee in a case where there is agreement with the matching result notified in step S202, based on an input operation by the used car dealer via the input unit 27. Subsequently, the used car dealer disposes the used BEV at the matched idle space.

The idle space owner also performs operations with respect to the used BEV disposed at the idle space owner (power supply location), as illustrated in FIGS. 7 and 8. The processing by the terminal apparatus 30 returns to step S401.

In step S203, the server 10 (the matching unit 114) stores location information regarding the idle space as power supply location information regarding a location at which power can be supplied from the used BEV in the power supply location information 125 in the storage unit 12.

As illustrated in FIG. 10, in step S102, the user terminal 40 (the position information transmission unit 412) transmits the position information 421 and the identification information 422 to the server 10 while the user is driving the BEV.

In step S204, the server 10 determines whether the SOC of the battery in the BEV has become less than or equal to a registered threshold for determining desire to charge (for example, SOC 30%, etc.), based on the position information 421 and the identification information 422 for the user's BEV. In a case where the SOC of the battery in the BEV is less than or equal to a registered threshold for determining desire to charge, the processing proceeds to step S205. In contrast, in a case where the SOC of the battery in the BEV is larger than the registered threshold for determining desire to charge, the processing returns to step S204.

In step S205, based on the position information 421 regarding the user's BEV transmitted in step S102 and the power supply location information 125, the server 10 searches for a match for a power supply location which has no reservation and is within a cruisable distance back-calculated from a most recent electrical consumption.

In step S206, the server 10 (the matching unit 114) transmits a search result for the match in step S205 to the user terminal 40.

In step S103, the user terminal 40 (the reservation unit 413) makes a reservation for the power supply location based on the match search result transmitted in step S206. The user then heads toward the reserved power supply location, and charges the BEV. Processing by the user terminal 40 then returns to step S102.

In step S207, the server 10 (the calculation unit 116) calculates an outsourcing operation fee to charge the used car dealer in accordance with a record (for example, a number of times charging and discharging has been performed) for the supply of power from the used BEV to a user's BEV, with the record being stored in the power supply location information 125 in the storage unit 12.

In step S305, the terminal apparatus 20 determines whether the used BEV has been sold based on an input operation by the used car dealer via the input unit 27. In a case where the used BEV has been sold, the processing proceeds to step S306. In contrast, in a case where the used BEV has not been sold, the processing returns to step S305.

In step S306, the terminal apparatus 20 (the registration unit 211) transmits to the server 10 a deletion instruction for deleting information regarding the sold used BEV from the device owner information 122.

In step S208, the server 10 determines whether a deletion instruction for information regarding the used BEV has been received from the terminal apparatus 20. In a case where a deletion instruction is received, the processing proceeds to step S209. In contrast, in a case where a deletion instruction is not received, the processing returns to step S201 in FIG. 9.

In step S209, the server 10 stops accepting new reservations after a predetermined time period (for example, one week, etc.) from the reception of the deletion instruction with respect to the power supply location where the sold used BEV is disposed. After the predetermined time period has elapsed, the server 10 deletes information regarding the used BEV for which the deletion instruction was performed from the device owner information 122 and deletes the idle space at which the used BEV was disposed from the power supply location information 125. The processing by the server 10 then returns to step S201.

By virtue of operation according to the present embodiment described above, it is possible to cause a used BEV to perform work (charging and discharging) at low cost, and it is possible for a user to inexpensively charge a BEV.

<Hardware and Software>

Note that each device included in the above-described matching system 1 can be realized by hardware, software, or a combination of hardware and software. A matching method performed by each device included in the above-described matching system 1 collaborating can be realized by hardware, software, or a combination of hardware and software. Realization by software means realization by a computer reading a program and executing the program.

It is possible for a program to be stored using various types of non-transitory computer-readable mediums, and supplied to a computer. A non-transitory computer-readable medium includes various types of tangible storage mediums. Examples of a non-transitory computer-readable medium include a magnetic recording medium (for example, a floppy disk, magnetic tape, or a hard disk drive), a magneto-optical recording medium (for example, a magneto-optical disk), a CD-ROM (read-only memory), a CD-R, a CD-R/W, or a semiconductor memory (for example, a mask ROM, a PROM (programmable ROM), an EPROM (erasable PROM), a flash ROM, or a RAM (random-access memory)). A program may be supplied to a computer by various types of transitory computer-readable mediums. Examples of transitory computer-readable mediums include an electrical signal, an optical signal, and electromagnetic waves. The transitory computer-readable medium can supply the program to the computer via a wired communication channel such as an electrical wire or an optical fiber, or via a wireless communication channel.

<First Variation>

The embodiment described above is a preferred embodiment according to the present invention, but the scope of the is not limited to only the embodiment described above. The present invention can be worked in an aspect resulting from applying various changes within a scope that does not deviate from the spirit of the present invention.

For example, functional configurations in FIGS. 2 and 4 to 6 are merely examples, and do not limit functional configurations according to the present embodiment. In other words, it is sufficient if functionality which can be executed by taking a series of processing pertain to functionality according to the present invention as a whole is provided in respective devices, and how functional blocks are used in order to realize this functionality is not limited to the examples in FIGS. 2, and 4 to 6 in particular.

For example, because a used BEV disposed at an idle space is capable of self-propulsion, in a case where, from among information regarding the used BEV registered in the device owner information 122 in the server 10, whether to have self-propelled dispatch at time of electrical depletion is set to "yes" for example, it may be that the server 10, upon receiving electrical depletion information indicating that a user's BEV has incurred electrical depletion from the user terminal 40, transmits to the terminal apparatus 30 held by the owner of the idle space a dispatch instruction for dispatching the used BEV in the idle space to the user's BEV based on received electrical depletion information and position information. It may be that the owner of the idle space, having received the dispatch instruction, drives the used BEV to go and charge the user's BEV which has incurred electrical depletion.

In this case, it may be that the control unit 11 in the server 10 functions as an acquisition unit for acquiring electrical depletion information regarding the user's BEV from the user terminal 40, and an instruction unit for, based on electrical depletion Information and position information received from the user terminal 40, making an instruction, to the terminal apparatus 30 held by the owner of the idle space, for a dispatch instruction for dispatching one used BEV from among a plurality of used BEVs disposed at the idle space to the user's BEV.

The embodiment described above may also be modified as with the variations described below, for example. Note that it may also be that the variations described below are combined.

<Second Variation>

The system configuration according to the embodiment described above is merely an example, and may be changed, as appropriate. For example, in the embodiment described above, the server 10 was described as being realized by one server apparatus, for example, but it may be that respective functions of the server 10 are distributed to an appropriate plurality of server apparatuses, and the server 10 is realized as a distributed processing system. Respective functions of the server 10 may also be realized using, for example, virtual server functions in a cloud.

<Third Variation>

A used BEV in the matching system 1 according to the embodiment described above charges a user's BEV, but there is no limitation to this. For example, it may be that, when a facility at an idle space has a power outage, a used BEV having sufficient SOC stops the V2V power supply service and releases 1500 W of output mounted in the used BEV to the facility.

EXPLANATION OF REFERENCE NUMERALS

1 Matching system
10 Server
11 Control unit
111 Device owner information acquisition unit
112 Idle space owner information acquisition unit
113 User information acquisition unit
114 Matching unit
115 Notification unit
116 Calculation unit
117 Presentation unit
20 Terminal apparatus
30 Terminal apparatus
40 User terminal
50 Communication network

What is claimed is:
1. A server comprising:
a device owner information acquisition unit configured to acquire, via a terminal apparatus held by an used car dealer who sells at least one used battery electric vehicle (BEV) provided with a battery, device owner information regarding the used car dealer;

a storage location owner information acquisition unit configured to acquire, via a terminal apparatus held by an owner of idle space who owns an idle space at which the at least one used BEV can be stored, storage location owner information regarding the owner of idle space;

a matching unit configured to match, in order to provide a power supply service, the at least one used BEV with an idle space at which the at least one used BEV is to be stored, based on the device owner information acquired by the device owner information acquisition unit and storage location information included in the storage location owner Information acquired by the storage location owner information acquisition unit;

a storage unit configured to store, as power supply location information regarding a power supply location at which the power supply service can be provided from the battery of the at least one used BEV, location information for where a match is established by the matching unit; and a notification unit configured to notify the power supply location information stored by the storage unit to a user who uses a BEV provided with a battery to charge the BEV of the user, wherein in a case where in response to the at least one used BEV having been sold, a deletion instruction to delete the at least one used BEV is sent from the terminal apparatus of the used car dealer to the server, the server deletes the information regarding the at least one used BEV to which the deletion instruction is directed from the device owner information after a predetermined time period has elapsed, and deletes the idle space where the at least one used BEV was disposed from the power supply location information.

2. The server according to claim 1, wherein
the storage unit further stores, in the location information stored as the power supply location information, advertising information which includes service information, and the notification unit notifies the advertising information together with the power supply location information.

3. The server according to claim 1, wherein
the storage unit further stores a record of visits by the BEV of the user who received a notification from the notification unit for supply of power, and the server further comprises a calculation unit configured to calculate, based on the record, a device storage fee to be charged to the used car dealer of the at least one used BEV.

4. The server according to claim 3, further comprising: a presentation unit configured to present other storage location owner information regarding other idle space to the used car dealer based on the record.

5. The server according to claim 1, further comprising:
an acquisition unit configured to acquire, from an external apparatus, electrical depletion information regarding the BEV of the user; and an instruction unit configured to, based on the electrical depletion information, make an instruction for dispatching one used BEV from among a plurality of used BEVs stored at an idle space to the BEV of the user.

6. A matching system, comprising:
the server according to claim 1;

one or more terminal apparatuses respectively held by one or more used car dealers who each sell at least one used BEV provided with a battery;

one or more terminal apparatuses respectively held by one or more owners of idle space who each own an idle space where at least one of the used BEV can be stored; and one or more user terminals respectively held by one or more users who each use a BEV provided with a battery.

\* \* \* \* \*